United States Patent

[11] 3,552,521

| [72] | Inventor | Ruben R. Tate |
| | | 126 S. Kaw, Bartlesville, Okla. 74003 |
| [21] | Appl. No. | 831,134 |
| [22] | Filed | June 6, 1969 |
| [45] | Patented | Jan. 5, 1971 |

[54] APPARATUS FOR WASHING LARGE VEHICLES
7 Claims, 2 Drawing Figs.

[52] U.S. Cl. ................................................ 182/17,
182/129, 182/132
[51] Int. Cl. ................................................ E06c 5/00
[50] Field of Search ................................ 182/17, 16,
15, 132, 129; 188/20, 21, 29, 57

[56] References Cited
UNITED STATES PATENTS

| 555,458 | 2/1896 | Mackenzie .................. | 188/20 |
| 1,440,645 | 1/1923 | Sullivan ........................ | 182/132 |
| 2,701,168 | 2/1955 | Schemers ..................... | 182/129 |
| 2,798,652 | 7/1957 | Easton .......................... | 182/17 |
| 2,818,266 | 12/1957 | Cabler .......................... | 188/20 |
| 3,163,880 | 1/1965 | Johnson ....................... | 182/14 |

FOREIGN PATENTS

| 791,282 | 2/1958 | Great Britain ................ | 182/15 |

*Primary Examiner*—Reinaldo P. Machado
*Attorney*—William S. Dorman

ABSTRACT: An apparatus for facilitating the washing of large vehicles such as tractor and trailer rigs and the like, comprising a rolling stairway having a liquid reservoir thereon and including a vacuum apparatus, if desired. The apparatus may be readily rolled into the desired position in the proximity of the large vehicle and the operator or service person may climb the stairs to the desired elevation in order to more easily reach the upper areas of the vehicle for cleaning thereof. The liquid reservoir may contain a suitable cleansing solution for facilitating the washing operation for the serviceman. The wheels of the washing apparatus may be selectively locked against rotation when the device is in position to preclude accidental rolling thereof when in use.

PATENTED JAN 5 1971

3,552,521

INVENTOR.
RUBEN R. TATE

BY

William S. Dorman

ATTORNEY

APPARATUS FOR WASHING LARGE VEHICLES

This invention relates to improvements in vacuum washing apparatus and more particularly but not by way of limitation to a washing apparatus for large vehicles.

Large vehicles such as tractor and trailer type rigs and the lie are did difficult to wash in that the large size thereof renders it difficult for a service attendant or operator to reach all portions. As a result, the service attendant frequently must climb onto portions of the vehicle, such as the fenders and hood, in order to reach the entire vehicle for efficient washing and cleaning thereof. This is a disadvantage in that it is not only dangerous for the serviceman but also may a scratch the finish or even dent the body of the vehicle.

The present invention contemplates an apparatus for facilitating the washing of these large vehicles to overcome the above disadvantages. The apparatus comprises a frame supporting a plurality of stairs or steps and mounted on wheels for ease of rolling into the most desirable position with respect to the vehicle to be washed. The wheels may be selectively locked when the apparatus is moved to the desired location to preclude accidental rolling of the stairs when in use. The service attendant may mount the stairs to the desired height for facilitating access to the vehicle. A reservoir or container is provided on the apparatus for storing a cleansing solution which is readily accessible to the attendant, thus further facilitating the washing of the vehicle. In addition, a vacuum device may be provided on the apparatus and readily accessible to the attendant for further facilitating cleaning of the vehicle.

It is another important object of this invention of to provide a novel washing apparatus for facilitating washing of large vehicles.

It is another object of this invention to provide a portable stair apparatus for disposition in the proximity of a large vehicle to facilitate access thereto during the washing operation.

Another object of this invention is to provide a novel portable washing apparatus for large vehicles wherein a supply of cleansing solution is readily accessible during the washing operation.

Still another object of this invention is to provide a novel washing apparatus for large vehicles which is simple and efficient in operation and economical and durable in construction.

Other and further objects and advantageous features of the present invention will hereinafter more fully appear in connection with a detailed description of the drawings in which.

Figure 1:
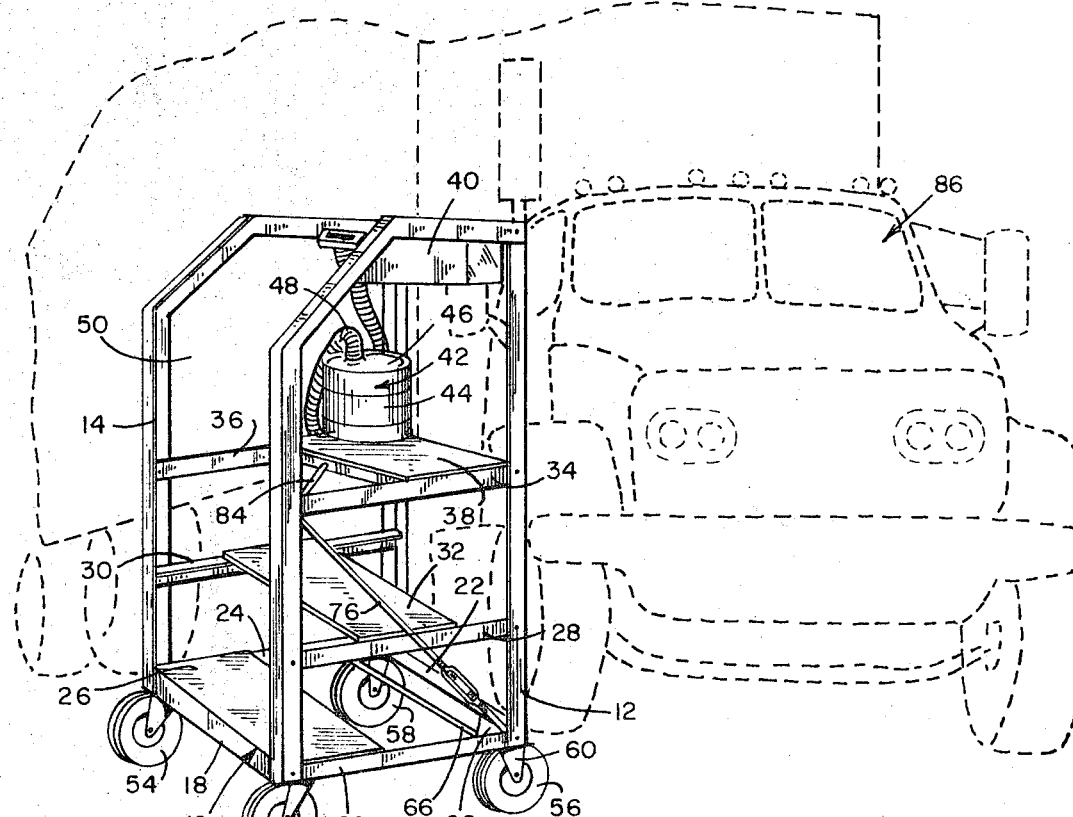
FIG. 1 is a perspective view of a vehicle washing apparatus embodying the invention with a large vehicle depicted in dotted lines for purposes of illustration.

Referring to the drawings in detail, reference character 10 generally indicates a car washing apparatus comprising a pair of sa spaced or oppositely disposed substantially rectangular side frames 12 and 14 suitably mounted on or secured to a substantially rectangular base frame 16. The base frame 16 may be of any suitable construction and as shown herein comprises four mutually perpendicular angle iron side members 18, 20, 22 and 24 welded or bolted together at each corner to provide rigidity for the base 16. A plate 26 is welded or otherwise secured to at least portions of the angle iron side members, such as the members 18, 20 and 24 as shown in FIG. 1, and preferably spans or covers approximately one half the upper surface or plane defined by the side members 18, 20, 22 and 24. The plate 26 provides a first step for the apparatus 10 for a purpose as will be hereinafter set forth.

The side frames 12 and 14 extend upwardly from the base 16 and are each provided with a first support member 28 and 30, respectively, spaced upwardly from the base 16. The supports 28 and 30 may be constructed from angle iron, or other suitable material, and are welded, bolted or otherwise secured to the respective side frames 12 and 14 for supporting a second plate member 32 therebetween. The plate 32 is generally similar to the plate 26, and may be welded or rigidly secured to the support members 28 and 30. The plate 32 is substantially centrally disposed on the supports 28 and 30 to provide a second step for the apparatus 10. The side frames 12 and 14 are each further provided with a second support member 34 and 36, respectively, spaced upwardly from the first support members 28 and 30 for supporting a third plate 38 therebetween. The plate 38 is generally similar to the plates 26 and 32 and may be suitably rigidly secured to the support members 34 and 36. The plate 38 preferably spans or covers approximately one half the plane area defined by and interposed between the supports 34 and 36, and preferably the half-area oppositely disposed from the half-area spanned or covered by the first plate 26 thus providing a third step for the apparatus 10, as clearly shown in FIG. 1.

A suitable container or reservoir 40 is secured between the side frames 12 and 14 in the proximity of the upper edges thereof. The container 40 is preferably disposed directly above the plate 38 and in spaced relation with respect thereto whereby the open upper end of the container 40 will be readily accessible at all times during use of the apparatus 10. Of course, if desired, a cover (not shown) may be provided for the reservoir or container 40. In addition, a suitable wringer apparatus (not shown) may be secured to one of the side frames 12 or 14 for facilitating the washing operation as will be hereinafter set forth. Furthermore, a suitable vacuum apparatus, generally indicated at 42 may be removably disposed on the plate 38. The vacuum 42 may be of any suitable type, and as shown herein comprises a substantially cylindrical housing 44 having a cover member 46 removably secured thereto in any well known manner (not shown). The cover member 46 carries a suitable motor, or the like (not shown) in communication with a vacuum tube 48 whereby suction is applied through the tube 48 in the usual manner. The tube 48 may be of the well known flexible type hose normally provided in vacuum devices of this type.

As hereinbefore set forth, the side frames 12 and 14 are in spaced relationship with one end 50 therebetween being open for providing ready access to the steps 26, 32 and 38. Thus, a service attendant or operator may ascent the steps to any desired level. In addition, it is to be noted that substantially any number of steps may be provided, and there is no intention of limiting the apparatus to the three steps depicted herein.

The base 16 is mounted for portability and as shown herein is provided with suitable wheels 52, 54, 56 and 58 mounted at the corners thereof. The wheels may be secured to the base in any suitable manner, and it is preferable that the wheels 52 and 54 be swivelly mounted in any well known manner for substantial universal movement thereof. The wheels 56 and 58 are preferably mounted for straight rolling movement only, and may be similarly secured to the base member 16. For example, as shown in FIG. 3, the wheel 56 is suitably journaled at 59 between a pair of spaced downwardly extending brackets 60 (only one of which is shown in FIG. 3) which are bolted or otherwise secured to a gusset 62 suitably secured between the angle iron members 20 and 22. Thus, the wheel 56 is freely rotatable about the journal 59 but the plane of the wheel 56 is substantially unchangeable or fixed.

Figure 2:
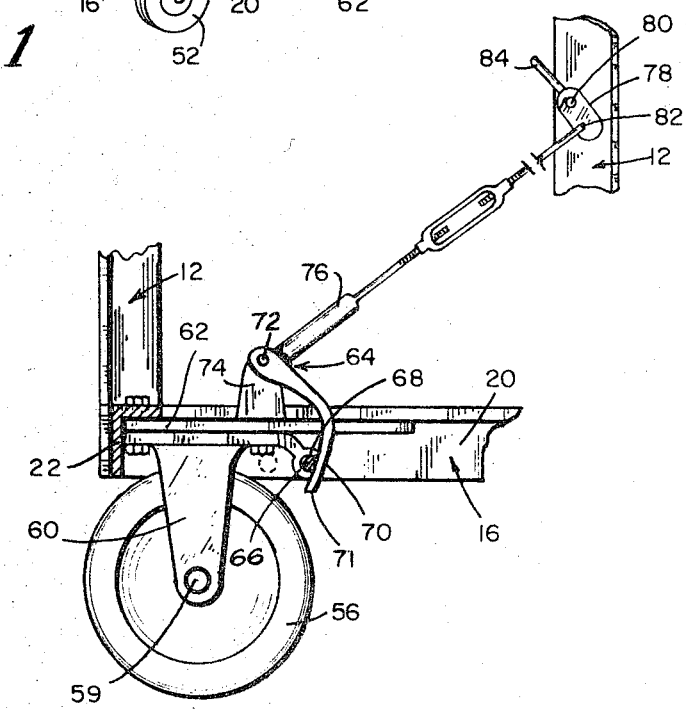
FIG. 2 is a broken sectional elevational view depicting one wheel and brake mounting embodying the invention.

In addition, it is preferable to provide a braking apparatus generally indicated at 64 for the wheels 56 and 58. The braking apparatus 64 may be of any suitable type and as shown herein comprises a rod member 66 extending between the wheels 56 and 58 and having the opposite ends thereof welded or otherwise secured in substantially axially aligned sleeves 68 which are pivotally secured to the brackets 60 of each wheel in any well known manner (not shown). (Only one of the sleeves 68 is shown in FIG. 2). The opposite ends of the rod 66 extend beyond the outer ends of the sleeves 68 and an angled brake arm 70 (only one of which is shown in the drawings) is welded or otherwise secured to each of the rod ends for transmitting movement to the rod 66 and rotating the sleeves 68 about the pivot connection thereof. The brake arms 70 are disposed in the proximity of the wheels 56 and 58, and are substantially identical. Accordingly, the detail description of only one of the brake arms 70 is set forth herein.

One end 70 of the brake arm 70 extends beyond the rod 66 in a direction toward the wheel 56 and the opposite end thereof is pivotally secured at 72 to an upstanding bracket 74 secured to the gusset plate 62. A brake actuator rod 76 is suitable suitably connected with the arm 70 for pivoting thereof around the pivot 72, and extends upwardly at an angle with the horizontal for suitable connection with the frame 12 for facilitating manipulation thereof. A bell crank 78 is pivotally secured to the frame 12 at 80, and the actuator rod 76 is pivotally secured to the bell crank 78 at 82 whereby manual pivoting of the bell crank 78 about the pivot point 80 will move the actuator rod 76 for pivoting the brake arm 70 about the pivot 72.

A handle member 84 may be provided for the bell crank 78 for facilitating manual pivoting thereof about the pivot 80. Pivoting of the bell crank 78 in one direction will move the actuator rod 76 in one direction for pivoting the arm 70 about the pivot 72 in a direction for rotating the rod 66 about the longitudinal axis thereof and moving the end 71 of the arm 70 into engagement with the outer periphery of the wheel 56. Of course, the wheel 58 is simultaneously engaged by the respective brake arm, thus providing an efficient and positive braking of the wheels 56 and 58. Rotation of the bell crank 78 in an opposite direction moves the actuator rod 76 in a reverse direction for pivoting the rod 66 and arm 70 in a reverse direction for releasing the arm 70 from engagement with the wheel 56, and simultaneously releasing the wheel 58 from engagement by the respective brake arm, thus releasing the braking engagement of the wheels 56 and 58.

In operation, the apparatus 10 may be used for facilitating the washing or cleaning of large vehicles 86, such as shown in dotted lines in FIG. 1. The apparatus 10 may be readily rolled along the surface of the ground into the desired position in the proximity of the vehicle 86. The swiveling action of the wheels 52 and 54 greatly facilitate the placing of the apparatus 10 in the desired position. When the apparatus is thus disposed in the proximity of the vehicle 86, the handle 84 may be manually moved for engaging the brake arms 70 with the wheels 56 and 58, as hereinbefore set forth. This substantially eliminates any accidental or unwanted rolling movement of the apparatus 10 during use thereof.

Of course, a suitable cleansing liquid or fluid may be placed in the container 40, and if desired a suitable wringer mechanism may be installed on the frame 12 or 14 in the proximity of the container, as hereinbefore set forth. The service attendant or operator may then ascend the steps 26, 32 and 38 of the apparatus 10 to the desired or optimum elevation with respect to the washing of the vehicle 86, and may thus handily reach substantially all portions of the vehicle with relative ease. The cleansing fluid may be utilized in the normal manner for washing or cleaning of the exterior and/or interior portions of the vehicle, as is well known. In addition, the vacuum apparatus 42 may be utilized in the normal manner for further cleaning of the vehicle. As the vehicle is being washed, it may be desirable to move the apparatus 10 around the vehicle in order to continue the washing operation. The handle 84 may be manually manipulated for releasing the braking engagement of the brake arms 70 with the wheels 56 and 58 whereby the apparatus 10 may be readily rolled or moved to the new operating position therefor. The brake apparatus 64 may be again set for precluding rolling movement of the apparatus 10, and the washing operation may be continued, as desired.

From the foregoing it will be apparent that the present invention provides a novel washing apparatus for facilitating the washing of large vehicles. The washing apparatus comprises a rolling stair or step assembly which may be readily positioned in the proximity of the vehicle to be washed. The wheels of the apparatus may be selectively locked against accidental rolling movement, and the operator or service attendant may climb or mount the stairs to the desired height or elevation for facilitating reaching of the vehicle during the washing operation, thus eliminating any need of climbing onto the body of the vehicle itself. A reservoir or container for a cleansing solution is provided on the apparatus whereby the cleansing solution will be convenient and readily available for the operator of the apparatus during the cleaning or washing operation. In addition, a vacuum may be provided on the apparatus for further facilitating the cleaning of the vehicle.

Whereas the present invention has been described in particular relation to the drawings attached hereto, it should be understood that other and further modifications, apart from those shown or suggested herein, may be made within the spirit and scope of this invention.

I claim:

1. A washing apparatus for large vehicles comprising a substantially rectangular base member including four side frame members rigidly secured together, a first plate member secured between one spaced pair of the side frame members, a support leg secured to each corner of the base member and extending upwardly therefrom, a first pair of substantially horizontally disposed spaced brace members each secured between a pair of the support leg members and spaced above and in substantial alignment with the first mentioned one spaced pair of side frame members, a second plate member secured between the first pair of brace members and parallel to and offset from the first place member, a second pair of substantially horizontally disposed spaced brace members each secured between the said spaced pairs of support legs and in substantial alignment with and spaced above the first pair of brace members, a third plate member secured between the second brace members and parallel with and offset from the first and second plate members whereby said plate members provide steps for the washing apparatus, said support legs extending above the third plate member, a pair of angled support members secured between said pairs of leg supports spaced above the third plate to provide arm rests for the apparatus, a wheel secured to each corner of the base member for portably supporting the apparatus, and brake means carried by the apparatus for selective braking of the movement of the wheels.

2. A washing apparatus for vehicles as set forth in claim 1 wherein the wheel means comprises a plurality of freely swiveling wheels and a plurality of substantially straight rolling wheels.

3. A washing apparatus for vehicles as set forth in claim 1 and including reservoir means carried by the support frame means for storing a cleaning fluid.

4. A washing apparatus for vehicles as set forth in claim 3 and including vacuum means for facilitating the cleaning operation.

5. A washing apparatus for vehicles as set forth in claim 1 wherein the brake means comprises brake arm members alternately engageable with the wheel means to provide a braking engagement therebetween, brake arm actuator means for providing alternate engaged and disengaged positions of the brake arm members with the wheel means. 7.

6. A washing apparatus for large vehicles as set forth in claim 1 wherein the wheel means comprises a pair of freely swiveling wheels and a pair of substantially straight rolling wheels.

7. A washing apparatus for large vehicles as set forth in claim 6 wherein the brake means comprises pivotal brake arm members alternately engageable and disengageable with the straight rolling wheels, and actuator means secured between the brake arm members and the side frame members for manual actuation of the brake arm members for selectively locking and unlocking the straight rolling wheels to provide alternate braking and free rolling movement therefor.